United States Patent [19]

Andrews

[11] 4,420,762
[45] Dec. 13, 1983

[54] CHART RECORDER

[75] Inventor: Wayne S. Andrews, Abbeville, Ala.

[73] Assignee: Techsonic Industries, Inc., Eufaula, Ala.

[21] Appl. No.: 344,381

[22] Filed: Feb. 1, 1982

[51] Int. Cl.³ .............................................. G01D 15/24
[52] U.S. Cl. ...................................................... 346/136
[58] Field of Search ................... 346/136, 145, 33 EC; 354/173

[56] References Cited

U.S. PATENT DOCUMENTS

| | | | |
|---|---|---|---|
| 1,017,984 | 2/1912 | Martin | 346/136 |
| 2,805,113 | 9/1957 | Brown et al. | 346/136 X |
| 2,989,357 | 6/1961 | Verrett et al. | 346/145 X |
| 3,268,908 | 8/1966 | Allen | 346/136 X |
| 3,331,081 | 7/1967 | Sihvonen et al. | 346/145 X |
| 3,683,403 | 8/1972 | Okino | 346/33 EC |
| 4,038,666 | 7/1977 | Fuller | 346/136 |
| 4,053,900 | 10/1977 | Strange | 346/136 |

FOREIGN PATENT DOCUMENTS 1325437 3/1963 France ................................. 354/173

*Primary Examiner*—Donald A. Griffin
*Attorney, Agent, or Firm*—Jones & Askew

[57] ABSTRACT

A chart recorder useful in a marine depth sounder or in other applications. Chart paper for the recorder is loaded into a paper cartridge, which is insertable in the recorder. The paper cartridge supports a roll of chart paper, a takeup spindle for winding the paper, and a viewing surface across which the paper travels after data marks are recorded on the paper. An internally-driven roller within the recorder frictionally engages the takeup spindle when the cartridge is in place, so as to move the chart paper at a selected linear speed. The drive roll is operated by an electric motor and a multiple-stage compound reduction gear arrangement, all entirely contained within the drive roller.

The paper marking stylus of the recorder makes full-time contact with a stylus engaging surface throughout each revolution of the stylus drive belt. An inductive sensing device is located between sides of the drive belt, and senses a magnet carried on the outside of the belt.

The chart recorder includes a door which can be hinged downwardly for access to the paper cartridge, or can be entirely removed from the recorder for that purpose. A lighted range indicating scale is attached to the door, and an improved scale illumination arrangement internally illuminates the scale.

28 Claims, 19 Drawing Figures

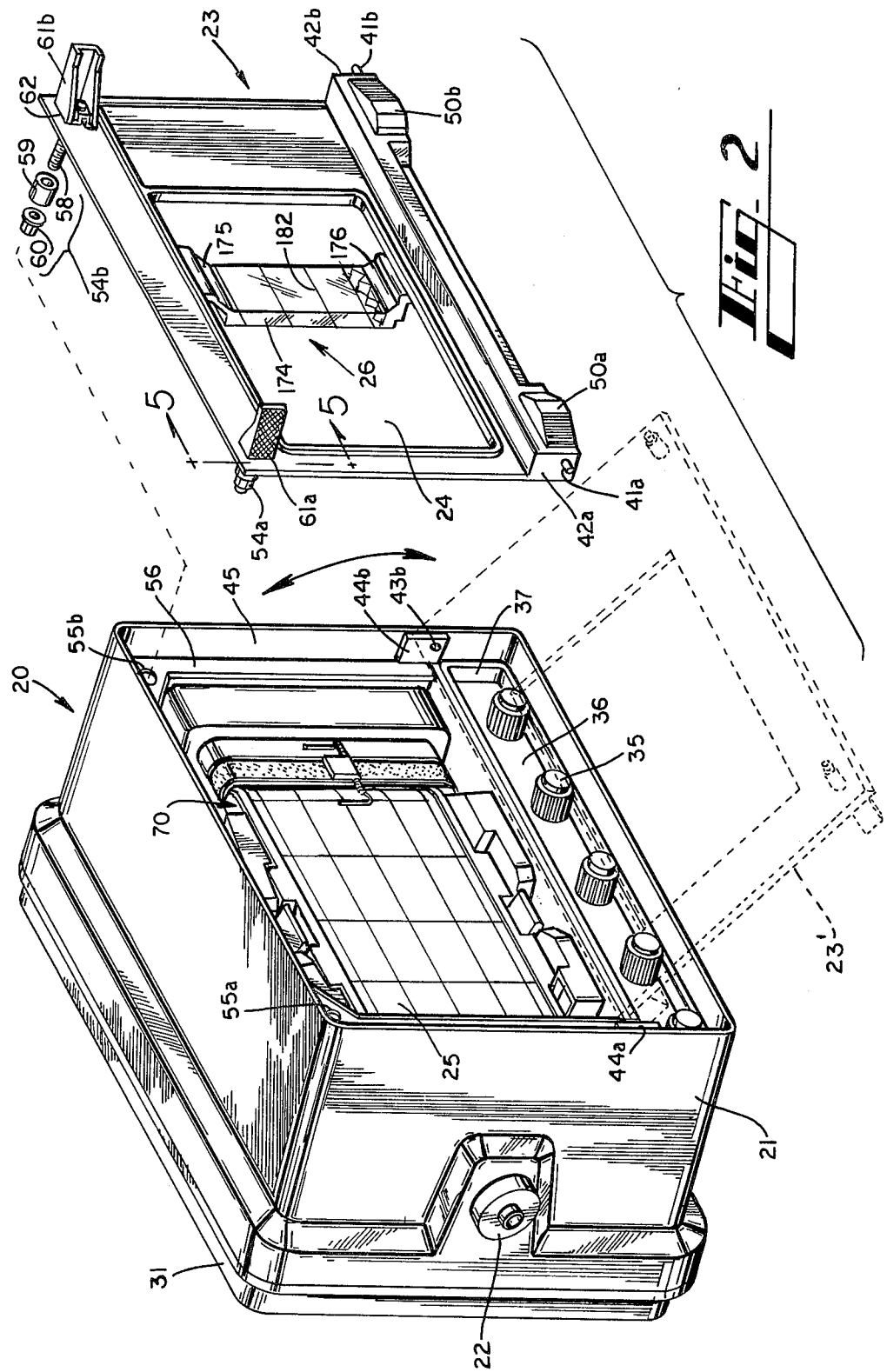

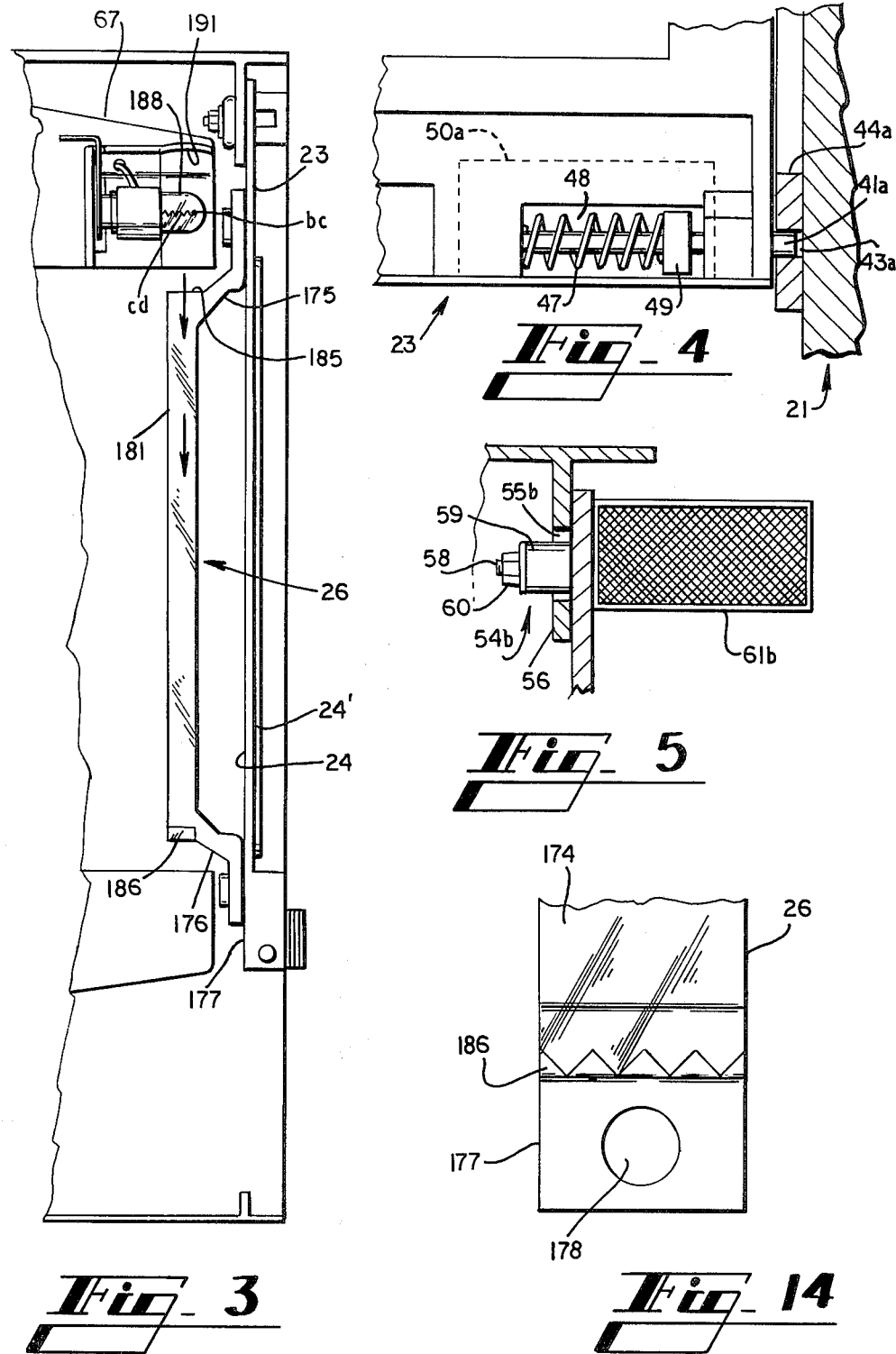

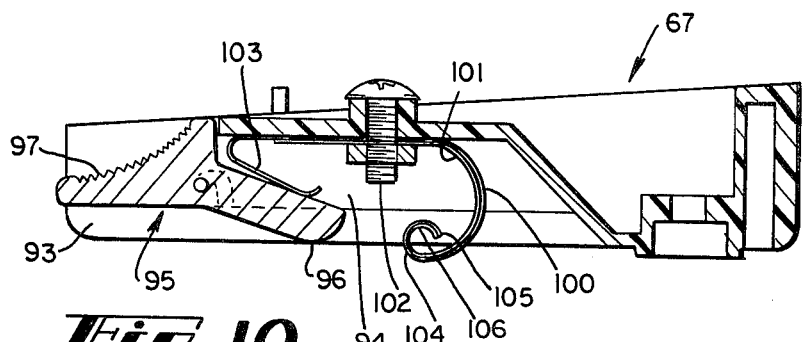
Fig_10
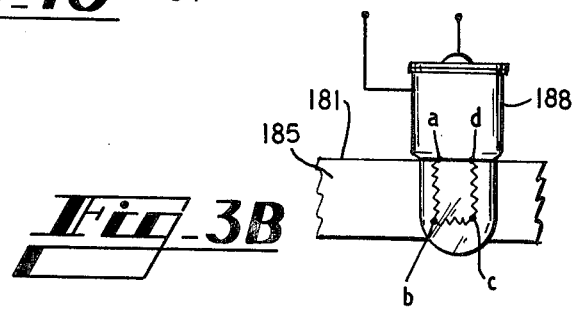
Fig_3B
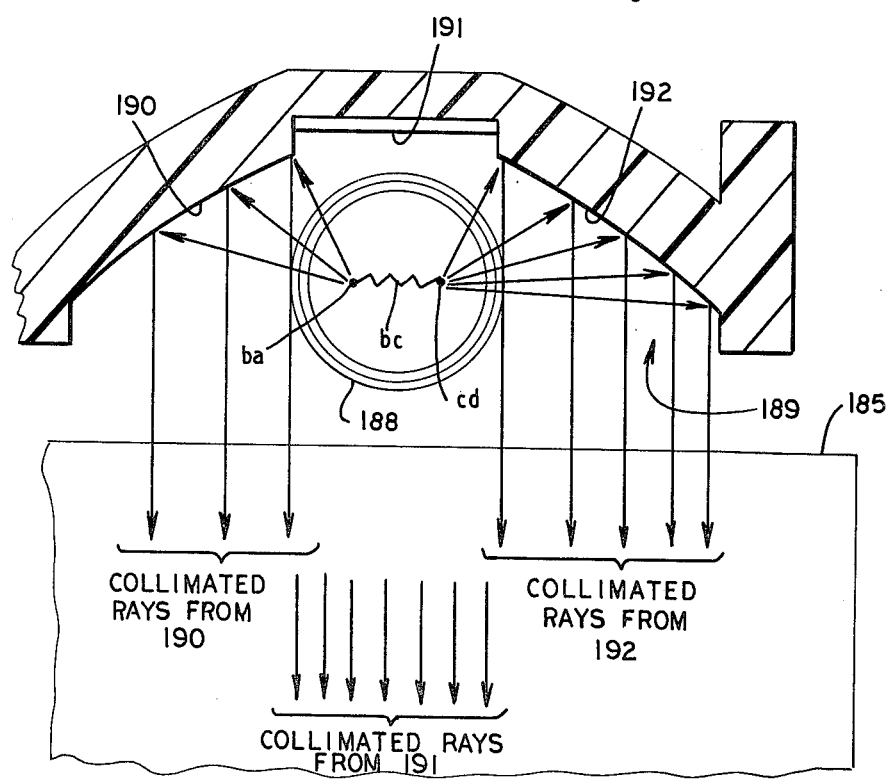
Fig_3A

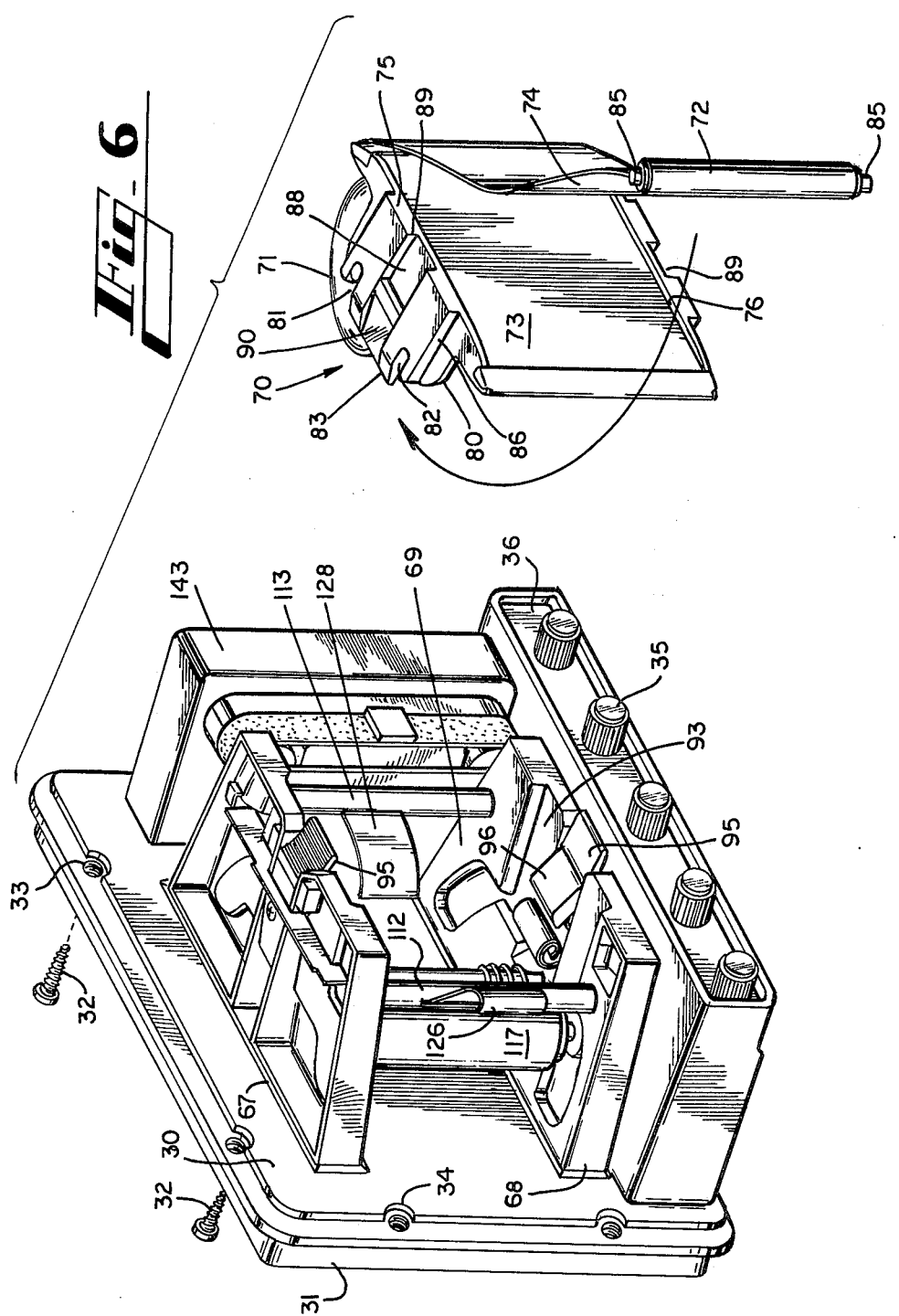

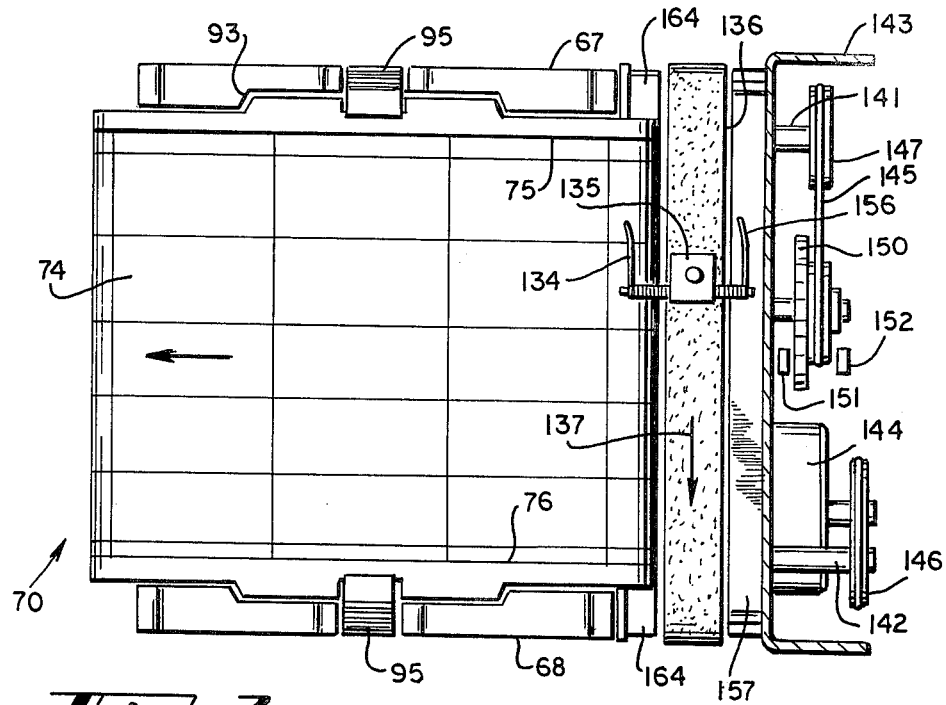
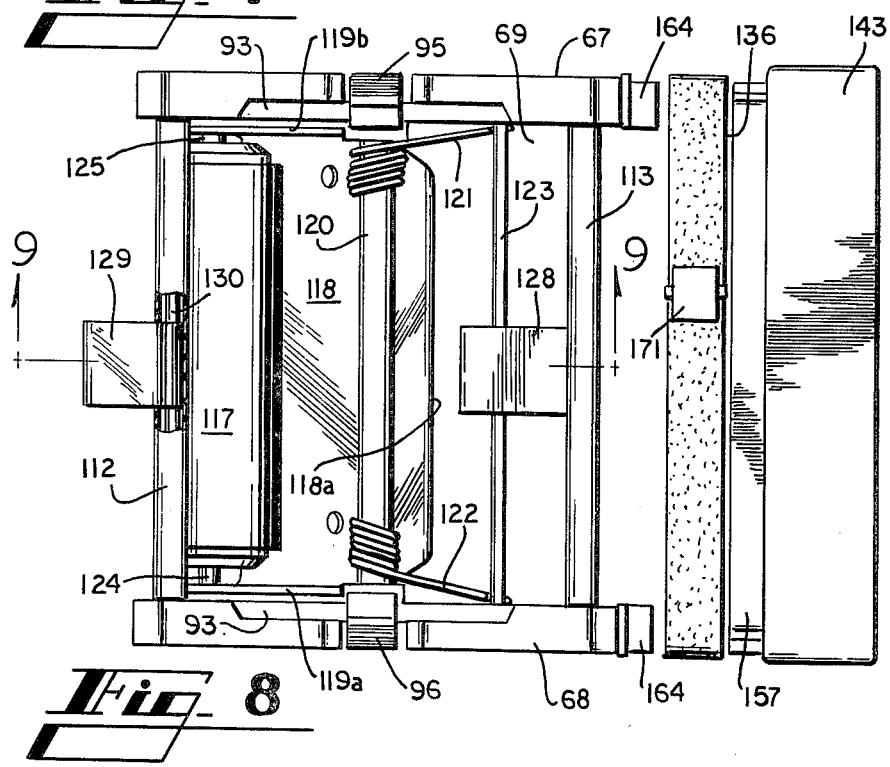

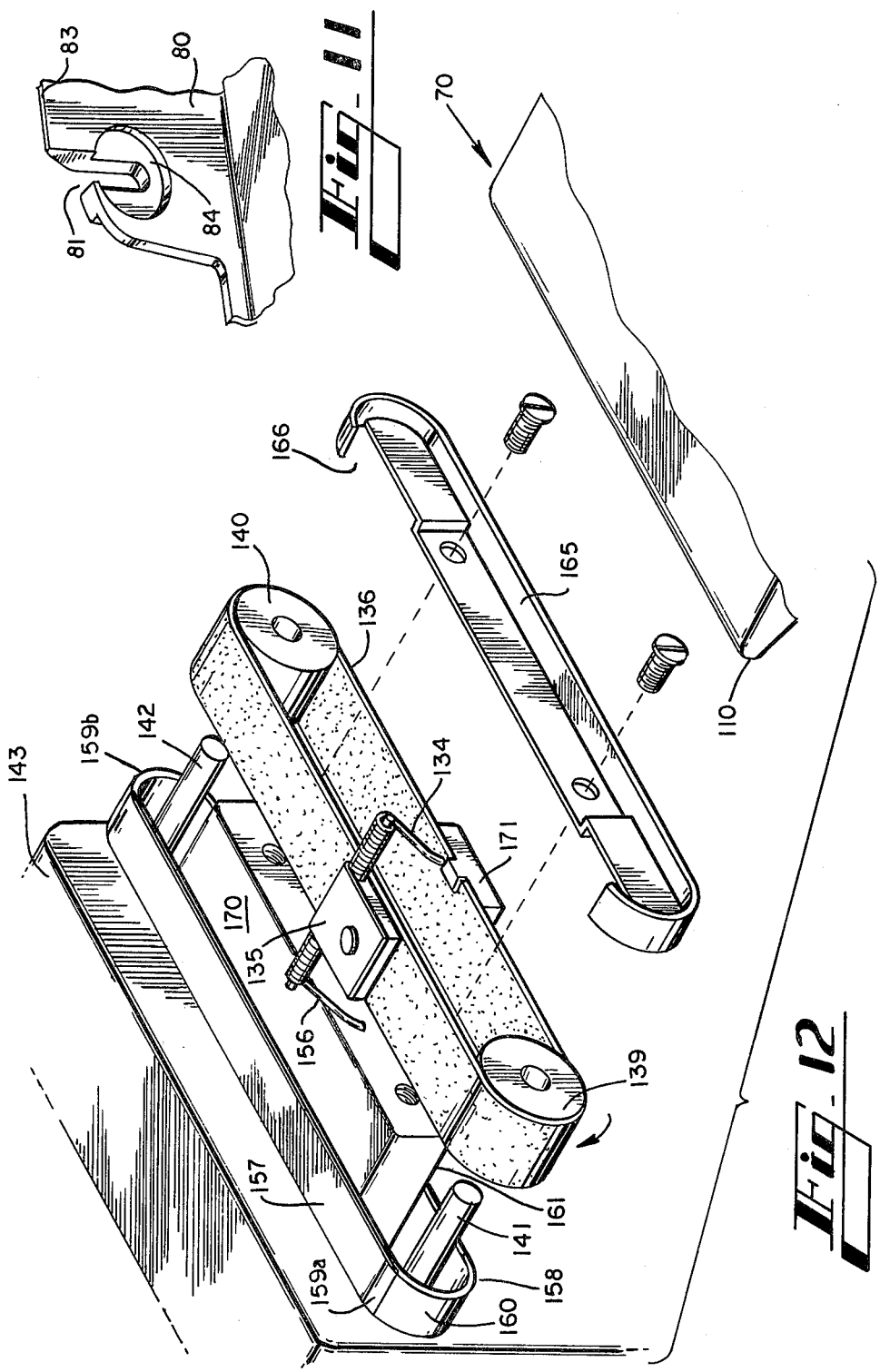

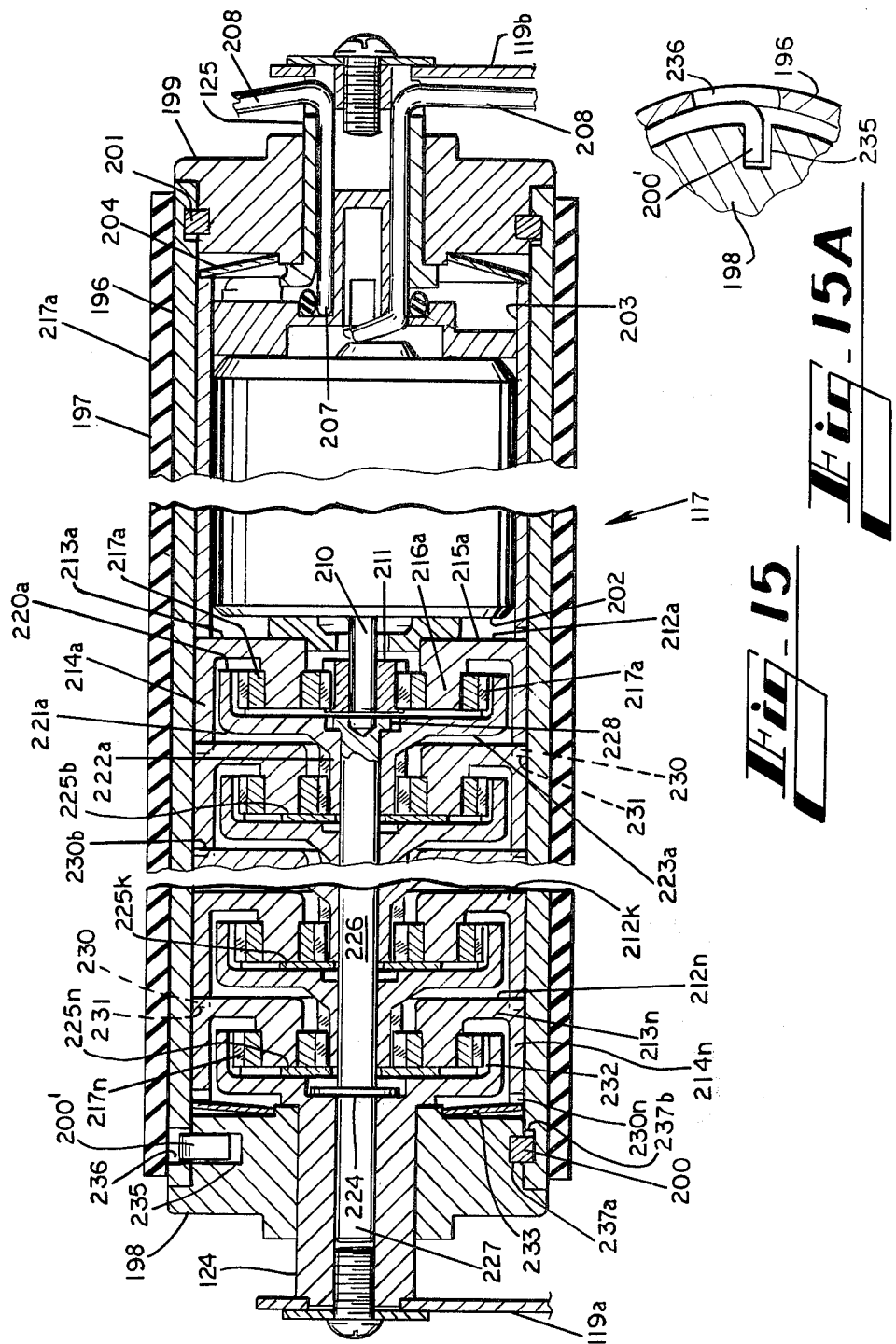

CHART RECORDER

FIELD OF THE INVENTION

This invention relates in general to data recorders, and relates in particular to chart recorders used in marine depth sounders or other applications.

BACKGROUND OF THE INVENTION

Chart recorders are used in various applications where it is necessary or desirable to make a permanent visual record of variable data. Although chart recorders of various types and sizes are known to the art, the typical chart recorder moves an elongated web or strip of recording medium relative to a device which marks the recording medium in response to the variable data being recorded. Various kinds of recording media are known, including plain paper marked with a pen stylus and various coated recording papers marked by a thermal or electric spark stylus.

The recording paper typically is supplied in roll form to the chart recorder, which feeds paper from the roll at a selected linear speed past the marking stylus. The marked paper may then move past a display window or region for immediate viewing, and may thereafter wind onto a suitable takeup spindle for storage. Alternatively, some chart recorders, such as EKG and other medical data recorders, dispense the marked paper for tearoff and immediate separation from the chart recorder.

Factors such as size limitations and paper speed limit the maximum amount of recording time available in a chart recorder without adding a fresh supply of recording paper. Consequently, a fresh supply of recording paper often must be added when it is least convenient to do so, namely, while other activities are taking place. For example, recording marine depth sounders are often used by fishermen to locate fish or promising fishing locations. Changing recording paper in a conventional chart recorder requires opening a door or face plate to the recorder, removing the roll of used paper, removing the core remaining from the exhausted paper roll, inserting a fresh roll of paper, and threading this paper through a convoluted path past the marking stylus and one or more paper guides for attachment to the paper winding spindle. Accomplishing all these steps with a conventional marine chart recorder in a small fishing boat is tedious, time-consuming and frustrating, especially where the boat may be moving and the person's hands may be slippery from handling bait or fish.

A number of other problems exist with recording marine depth sounders and other chart recorders of the prior art. For example, the recording paper transport mechanism found in such recorders includes exposed gears or other drive train elements. These gears are subject to becoming coated with dust or dirt, such as rubber dust from drive belts or powdery material from the coating used on the chart paper. The efficiency and longevity of such exposed drive trains is thus impaired.

The manner of moving chart paper through chart recorders has also presented problems, especially where relatively slow linear speeds are desired. The recording paper must move past the marking stylus at a substantially constant selected speed, inasmuch as paper speed fluctuations produce a nonlinear time base against which depth or other measured data is recorded. Many chart recorders have sought to provide linear paper drive by means of a power-driven pinch roller or capstan which engages and pulls the chart paper past the printing stylus. A separate drive connection to the paper takeup shaft is also required, capable of driving the takeup shaft at variable speeds as the effective diameter increases due to paper winding. Takeup shaft drive in the prior art recorders is usually accomplished through a slip clutch, which further complicates the paper drive arrangement. Such paper takeup slip clutches sometimes fail to provide the necessary "slip" or overrun, particularly at relatiely low linear paper speeds, causing the takeup shaft to pull the chart paper faster than the nominal paper speed of the pinch rollers. This problem is frequently enhanced by a lack of paper-pulling torque sometimes exhibited at low linear paper speeds, due to slippage or other inefficiencies of the pinch roller arrangement.

Other problems associated with chart recorders of the prior art are addressed with reference to the improvements set forth in the following disclosed embodiment of the present invention.

SUMMARY OF INVENTION

One feature of the present invention, stated in general terms, comprises a chart recorder incorporating a cartridge for supporting the chart paper. Chart paper is preloaded in a cartridge, and a cartridge containing a fresh supply of paper is easily installed in the chart recorder without threading or handling the paper.

Stated somewhat more specifically, the present chart recorder incorporates a receptacle for removably accommodating a paper cartridge adjacent the paper marking stylus. The removable cartridge supports a fresh roll of chart paper as well as a paper takeup spool, and the cartridge defines a display or viewing region which the chart paper traverses between the supply and takeup spool. When the cartridge is installed in the recorder the paper is positioned to be marked by the marking stylus of the recorder. The marked paper then traverses the display space and thereafter is then wound onto the takeup spool. The cartridge is conveniently removed from the recorder at any time by manipulating a latching mechanism, and removal may be assisted by springs which urge the cartridge outwardly when the latches are released.

The chart paper drive mechanism of the present recorder includes a powered traction roller which turns at a selected constant speed to move chart paper past the marking location. The roller frictionally engages the periphery of the paper takeup spool when the cartridge is positioned in the recorder, so that chart paper is pulled past the marking location and wound onto the takeup spool at a constant rate determined by the peripheral speed of the drive roller. Thus, the single traction drive roller provides the dual functions of moving the chart paper past the marking location at a selected speed, and driving the takeup spool to wind paper at the selected speed. Moreover, the drive roller easily engages and disengages the takeup spool of the removable cartridge.

The drive roll is powered by a motor and reduction gear arrangement entirely contained within the hollow drive roll. The drive arrangement includes a compound gear drive train within the drive roller, reducing speed and increasing torque of the motor to desired levels. Multiple stages of the compound gear drive train are provided so that different selected levels of speed reduction and torque enhancement are available.

Other features and advantages of the present chart recorder will become more apparent from the following summary of objects and description of a preferred embodiment.

Accordingly, it is an object of the present invention to provide an improved chart recorder.

It is another object of the present invention to provide a chart recorder with an improved paper drive.

It is still another object of the present invention to provide a chart recorder with a readily-replacable paper cartridge.

It is a further object of the present invention to provide a drive roller having a motor and speed reduction gears contained within the roller.

Other objects, advantages, and improvements provided by the present invention will become more apparent from the following description of a disclosed preferred embodiment.

BRIEF DESCRIPTION OF DRAWINGS

FIG. 2 is a partially exploded view of the recorder shown in FIG. 1, with the access door of the recorder shown fully removed in solid line and shown hinged downwardly in broken line.

FIG. 3 is a fragmentary vertical section view showing details of range scale illumination in the disclosed embodiment.

FIG. 3A is a fragmentary sectioned elevation view of the scale illumination reflector.

FIG. 3B is a fragmentary top plan view of the light bulb in FIG. 3A.

FIG. 4 is a fragmentary vertical section view from behind the access door of FIG. 2 showing details of a bottom hinge for the access door.

FIG. 5 is a fragmentary vertical section view along line 5—5 of FIG. 2, in unexploded form, showing details of an upper latch for the access door.

FIG. 6 is a pictorial view of the disclosed recorder without the outer housing, showing the paper cartridge exploded and the recording paper partially removed.

FIG. 7 is a front elevation view showing recorder details with the paper cartridge in place.

FIG. 8 is a front elevation view as in FIG. 7, with the paper cartridge removed.

FIG. 10 is a section view along line 10—10 of FIG. 9, showing details of the structure for retaining and ejecting the paper cartridge.

FIG. 11 is a fragmentary pictorial view showing details of the paper cartridge.

FIG. 12 is an exploded pictorial view showing details of the paper marking stylus and related structure in the present recorder.

FIG. 14 is a fragmentary detail view showing the lower end of the range scale.

FIG. 15 is a section view, partially broken away, showing the compound gear drive within the paper drive roller.

FIG. 15A is a fragmentary section view taken at one end of the drive roller.

DESCRIPTION OF PREFERRED EMBODIMENT

Figure 1:
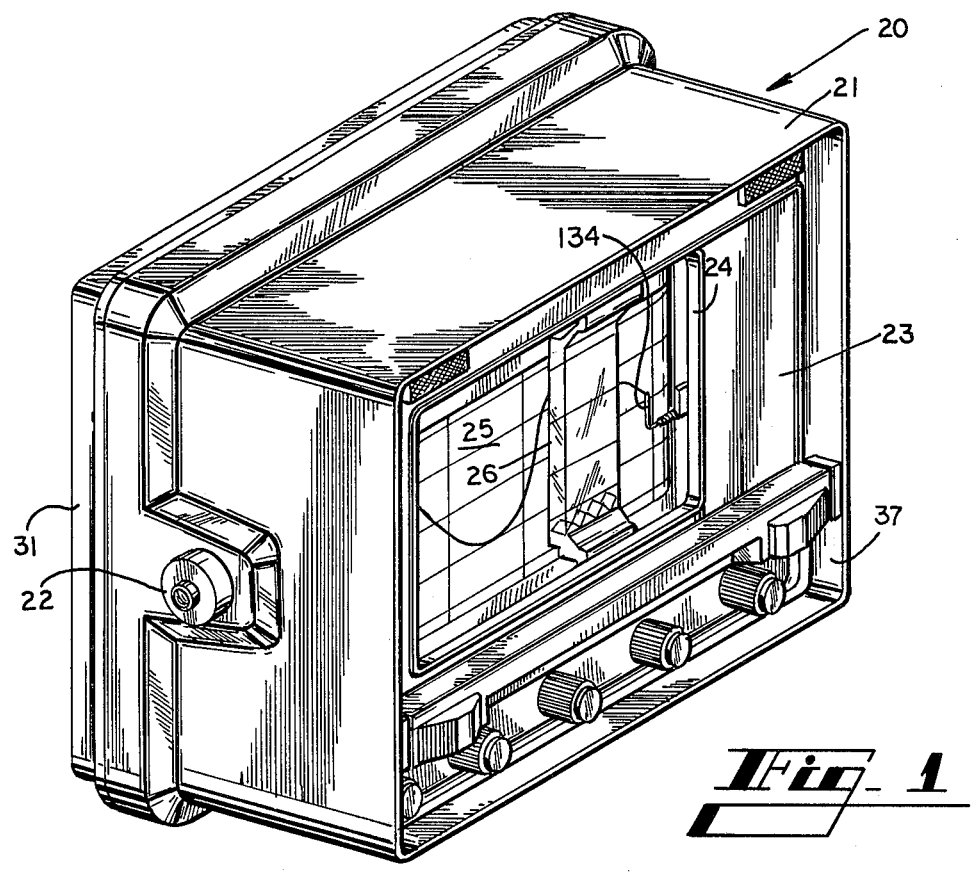
FIG. 1 is a pictorial view showing a marine depth sounder chart recorder according to a preferred embodiment of the present invention.

Turning first to FIG. 1, there is shown generally at 20 a chart recorder marine depth sounder according to the disclosed embodiment of the present invention. The chart recorder 20 includes an overall external housing 21 having a pair of mounting posts, only one of which is visible at 22, for retaining the recorder in a suitable support such as a U-shaped mounting bracket (not shown) or the like. A door 23 is attached to the front of the housing 21, and as explained below, the door is equipped to open downwardly relative to the housing, or to detach from the housing. A viewing window 24 is framed in the door 23 for exposing to view the chart paper 25 and the recorded information marked thereon. The viewing window 24 is preferably closed with a transparent material 24' (FIG. 3) of glass or a suitable plastic, and the window material is preferably tinted a color such as amber or the like to improve viewing contrast. An illuminated range scale 26 described in greater detail below is mounted to extend vertically across the viewing window 24. The range scale 26 contains indicia calibrated to the marking scale(s) of the chart recorder, enabling the viewer to correlate markings on the chart paper 25 with corresponding depth in feet or fathoms.

The chart recorder 20 with the housing 21 removed is shown in FIG. 6. A vertical support panel 30 is normally covered by the housing 21, and a back cover 31 nests behind the support panel 30. Both the back cover 31 and the housing 21 are held in assembly on the chart recorder by a plurality of screws 32 which are inserted through openings 33 spaced along a peripheral flange of the back cover. The screws 32 extend without engagement through the notches 34 formed in the periphery of the support panel 30, and engage rearwardly-facing mounting holes (not shown) formed at the back of the housing 21. The screws 32 thus hold together the back cover 31 and the housing 21 in assembly on the recorder 20.

The back cover 31 extends rearwardly a distance from the support panel 30, providing sufficient room for circuit boards and related electronic components of the present chart recorder. These electronic components include circuits for transmitting and receiving periodic pulses of ultrasonic accoustic energy, and for processing signals derived from the received pulses. Electronic signal transmitting, receiving, and signal processing circuits for marine depth sounders are known to those skilled in the art and is not further disclosed herein. The several operating controls 35, extending outwardly from the panel 36 located below the door 23 and extending through an elongated slot 37 (FIG. 2) formed in the front of the housing 21, control recorder operating variables such as paper speed, range scale selection, recorder sensitivity, and the like.

The door 23 of the housing 21 must permit access to the interior of the recorder for replacing the chart paper 25, as described below. For this purpose, the door 23 may either be fully detachable from the housing 21 as shown in solid line in FIG. 2, or may alternatively remain attached to the recorder while opened and pivoted downwardly to the position 23' shown in phantom outline in that figure. Although completely removing the door 23 may facilitate loading the chart paper and may normally be preferable, the hinged opening alternative allows the user to write comments on the chart paper without entirely removing the door from the recorder. Moreover, the door can remain attached to the recorder in marine applications such as small sport fishing boats, where the boat may be tossed about by waves and the like while the chart paper is being replaced.

The access door 23 is pivotably attached to the housing 21 by a pair of hinge pins 41a, 41b (FIG. 2) horizontally extending outwardly from the lower side edges 42a, 42b of the access door. These hinge pins 41a, 41b loosely fit into hinge appertures 43a (FIG. 4) and 43b (FIG. 2) formed in pads 44a, 44b secured to the inside surface 45 of the housing 21 adjacent the front opening into which the access door 23 fits.

Details of the hinge pins are shown in FIG. 4, where the hinge pin 41a is biased outwardly by the spring 47 to enter the aperture 43a. The spring 47 fits within a recess 48 formed in the back side of the access door 23. The spring 47 exerts force on the finger 49, which is attached to the hinge pin 41a and slides with the hinge pin within the recess 48. The finger 49 extends outwardly through a slot in the front of the access door 23, terminating in the hinge release button 50a (FIG. 2) on the exterior of the access door 23. A companion access button 50b is connected to the other hinge pin 41b.

The upper edge of the access door 23 is detachably secured to the housing 21 by a pair of expandable members 54a, 54b which fit into openings 55a, 55b near the top of the peripheral flange 56 extending a short distance inwardly from the inside surface 45 of the housing 21. Each expandable member 54a and 54b, as best seen in FIGS. 2 and 5, includes a post 58 loosely surrounded by a compressible rubber grommet 59 on the back side of the access door 23 and secured at one end to a fastener 60. The other end of the post 58 passes through an opening (not shown) in the door 23, terminating at a connection to the locking lever 61b on the outside of the door. A similar locking lever 61a is associated with the other expandable member 54a at the top-left of the access door 23.

The locking levers 61a and 61b are finger-movable between the open position shown in FIGS. 2 and 5, and the closed position shown in FIG. 1. Each locking lever has a cam surface 62 engaging the front of the access door 23. The post 58 is fully extended when the locking lever 61b is pivoted upwardly to the open position, permitting the grommet 59 to retain its normal cylindrical shape shown in FIG. 5. The grommet 59 thus is of a size to pass freely through the opening 55b, allowing the access door 23 to hinge downwardly into the open position shown in phantom at 23' in FIG. 2. However, when either locking levers 61a or 61b is moved to lie flat against the access door 23, this movement of the cam surface 62 pulls the post 58 toward the access door, pulling the fastener 60 against the grommet 59. The grommet 59 thus is compressed and radially expanded sufficiently to prevent passage through the opening 55b in the housing flange 56. The access door 23 thus is locked in its closed position when the locking levers 61a and 61b are in the closed position.

It will now be seen that the access door 23 either can be hinged downwardly to the position 23' shown in FIG. 2, or can alternatively be completely removed from the housing 21 as also illusrated in that figure. To remove the access door 23, the locking levers 61a and 61b are first opened to release the top latches. The locking buttons 50a and 50b are then each moved inwardly toward each other, withdrawing the hinge pins 41a and 41b from their respective appertures. The entire access door 23 may now be removed for installing or removing the paper cartridge. The quick-release feature provided by the withdrawable hinge pins permits access door removal where a particular recorder installation may limit the swing of the access door about the hinge pins.

Details of the chart paper drive assembly and the removable paper cartridge are best seen in FIGS. 6–10. Separate top member 67 and bottom member 68 are attached to the support panel 30 of the chart recorder. The members 67 and 68 extend forwardly from the support panel 30, and the top and bottom members are vertically spaced apart to define an open region 69 for receiving the removable cartridge 70. The members 67 and 68 provide support and alignment for the vertical guide posts 112 and 113 on either side of the open region 69, and for the shaft 120 (FIG. 8) at the back of the open region. Long thrubolts (one shown at 130 in FIG. 8) extend through the guide posts 112, 113 and are secured to the top and bottom members 67 and 68, so that the chart paper drive assembly becomes a modular subassembly to the chart recorder. This paper drive assembly, including components disclosed and described below, may be used in various other chart recorder applications.

The paper cartridge 70 supports a roll 71 of fresh recording paper, and also supports a takeup spindle 72 onto which the paper is wound as described below. The cartridge 70 includes a substantially flat front face 72, and a web of paper 74 traverses the front face while being wound from the supply roll 71 onto the takeup spindle 72. The upper end 75 and lower end 76 of the cartridge may protrude outwardly from the flat surface 73 to define edge surfaces laterally guiding the paper 74 moving along the face 73.

Figure 9:
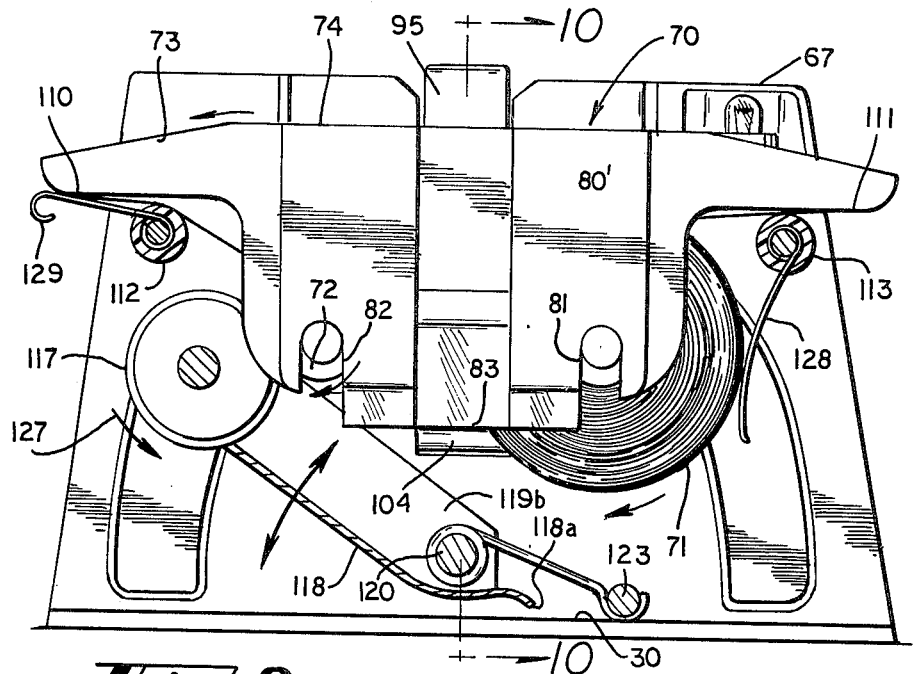
FIG. 9 is a section view taken along line 9—9 of FIG. 8, with a paper cartridge shown in place.

The cartridge 70 preferably is symmetrical about imaginary horizontal and vertical planes bisecting the cartridge as viewed in FIG. 6, so that the upper and lower ends 75 and 76 have the same shape. The upper end 75 of the cartridge includes a wall 80 extending rearwardly behind the paper traversing surface 73 of the cartridge, and the lower end of the cartridge has a similar wall 80' (FIG. 9). A pair of slots 81 and 82 extend forwardly from the back edge 83 of the wall 80. As shown in FIG. 11, the bottom surface of the wall 80 includes a circular countersunk recess 84 concentric with the radius formed at the closed inner end of the slot 81, and it should be understood that the other slot 82 terminates at a similar countersunk recess at the underside of the wall 80. The countersunk recesses in the walls accommodates the flanged end members 85 at each end of the takeup shaft 82, and likewise at either end of the paper supply roll 71, thereby retaining the takeup spindle and supply roll in place within the cartridge 70. The walls 80 of the cartridge are sufficiently resilient to permit bending to remove or insert the takeup shaft and supply roll.

A channel recess 88 is formed in the outer surface of each wall 80. This recess 88 is centered along the horizontal extent of the cartridge 70, and the front of the recess is open as shown at 89. The thickness of the wall 82 narrows at the region 90 a short distance behind the recess 88, so that the region 90 provides a beveled surface sloping downwardly toward the back edge 83 of the wall.

The entire cartridge 70 is preferably a unitary member, molded of a suitable plastic material or the like.

Inasmuch as the cartridge 70 is symmetrical as previously mentioned, the lower end wall is identical in configuration to the upper end wall 80, and so the cartridge can be inserted either end in the open region 69 of the chart recorder. Thus, the supply roll 71 of paper and the takeup spindle 72 can be loaded into the cartridge 70 without regard to which slot 81 or 82 receives the supply or takeup. The cartridge 70 is then oriented to place the supply roll 71 to the right, as the cartridge is loaded into the open region 69 of the chart recorder.

Referring again to the end members 67 and 68 of the chart recorder, each end member has an inwardly-facing channel 93. Each channel 93 is open to the front, and is slightly wider than the overall ridge 86 facing outwardly from each wall 80 of the cartridge 70. A recess 94 (FIG. 10) is formed within each channel 93, and a latch member 95 is pivotably mounted in each such recess. Each latch member 95 has at one end a projection 96 capable of extending outwardly into the channel 93, and has at the other end a finger engaging area 97 extending away from the channel. The finger engaging area 97 of each latch member 95 is preferably corrugated or otherwise roughened to provide a good finger gripping surface.

Disposed in the recess 94 is a multipurpose spring arrangement made up of a primary spring 100 and a secondary spring 101 closely conforming to central and back portions of the primary spring. Both springs are secured in the end member 67 by a fastener 102 extending through the end member. Both primary spring 100 and secondary spring 101 are leaf springs, and the primary spring includes a portion extending forwardly of the fastener and curved backward at 103 to lie beneath the projection 96 of the latch member 95. The portion 103 of the primary spring 100 thus normally biases the projection 96 to protrude outwardly into the channel 93.

The primary spring 100 extends behind the fastener 102 and thereafter curves outwardly and thence forwardly to provide the rolled cylindrical portion 104 facing toward the front of the channel 93. The curvature of the primary spring 100 continues to its inner end 105, located behind the curved portion 104. The secondary spring 101 has a rolled cylindrical portion 106 closely complementary to the portions 104 and 105 of the primary spring 100. This portion 106 of the secondary spring fits within and behind the rolled cylindrical portion 104 of the primary spring, and provides added stiffness to that portion of the primary spring. The other end of the secondary spring 101 terminates in front of the fastener 102.

It should now be apparent that the cartridge 70 is loaded into the recorder by aligning the ridges 86, at each end of the cartridge, with the mating channels 93 formed in the members 67 and 68. The cartridge 70 is then moved into the open region 69, and the back edges 83 at the ends of the cartridge contact the curved portion 104 of each primary spring 100 as the cartridge moves into the open region 69. The cartridge 70 is fully inserted when the projections 96 of the latch members 95 pass over the beveled surfaces 90 of the cartridge and snap into the recess 88 at each end of the cartridge. The primary and secondary springs at this time are deflected backwardly by the presence of the cartridge, the rolled cylindrical portion 104 engaging the back edge 83 of the cartridge as seen in FIG. 9. The resultant line of force of the springs acts to urge the cartridge forwardly against the latch members 95 and simultaneously urges the cartridge walls 80 and 80' to a slightly more open stance, relieving end drag on the end members 85 of the supply roll 71 and the takeup spindle 72. The cartridge 70 is thus firmly inserted in the chart recorder.

The cartridge 70 is removed from the chart recorder simply by concurrently pressing the finger engaging area 97 of each latch member 95, an operation easily accomplished by the thumb and index finger of one hand. Pressing the finger engaging areas 97 inwardly pivots each latch member 95 to withdraw each projection 96 from the corresponding recess 88 on the end members of the cartridge 70. When the projections 96 are thus disengaged, the primary and secondary springs 100 and 101 dislodge the cartridge 70 outwardly a short distance from the recess 69 and simultaneously relieve the opening forces applied to the end walls 80 and 80' of the cartridge, so that the end walls again grip the supply roll 71 and takeup spindle 72 more securely. The supply roll and takeup spindle thus are inhibited from unwinding while the cartridge is removed from the chart recorder. The cartridge now is easily grasped and manually withdrawn from the recess.

When the loaded paper cartridge 70 is fully inserted in the open region 69, the rear end surfaces 110 and 111 of the cartridge are located in closely spaced-apart relation immediately in front of the two guide posts 112 and 113 vertically extending between the two members 67 and 68. The web of chart paper 114 extending between the supply roll 71 and the takeup shaft 72 passes between the guide posts 112, 113 and the respective cartridge surfaces 110, 111, best seen in FIG. 9, an arrangement which tends to maintain the chart paper web 74 relatively taut across the front face 73 of the cartridge. The guide posts 112 and 113 may be covered with a relatively low-friction material such as Teflon or the like, or otherwise finished with a smooth surface to reduce the sliding friction of the chart paper being drawn across the posts.

When the loaded paper cartridge 70 is fully inserted in the open region 69, the periphery of the takeup shaft 72 engages the surface of the paper drive roller 117. The paper drive roller 117 (best seen in FIGS. 6, 8, and 9) is mounted between the opposed flanges 119a, 119b of the roller support yoke 118. The yoke 118 is mounted for rotation on the yoke shaft 120 (FIGS. 8 and 9) extending between the two members 67 and 68 at the rear of the open region 69. A pair of torsion springs 121 and 122 are wound around the ends of the shaft 120 and engage the yoke 118 to resiliently bias the yoke and the drive roller 117 forwardly into engagement with the takeup shaft 72 carried by the paper cartridge 70. The rear edge 118a of the yoke 118 engages the support panel 30 to provide a motion stop limiting full-forward movement of the yoke.

The drive roller 117 is mounted on the yoke 118 by the axial mounting posts 124 and 125 extending from the roller ends to engage the flanges 119a and 119b of the yoke. The mounting posts 124 and 125 are nonrotatably affixed to the yoke flanges, and are attached within the drive roller to an internally-contained motor and driving mechanism which powers the drive roller. This operating mechanism is described below in greater detail with respect to FIGS. 15 and 16. The peripheral surface of the drive roller 117 is made of rubber or another suitable elastomeric material which provides a good frictional engagement with the chart paper wrapped around the takeup shaft 72, so that drive roller rotation indicated by the arrow 127 in FIG. 9 engages and rotates the takeup shaft 72 at a constant peripheral speed determined by the peripheral speed of the drive roller.

Referring again to FIGS. 8 and 9, a paper damper 128 in the form of a leaf spring is shown attached to the guide post 111 at the right side of the open region 69. This paper damper 128 is positioned to engage the paper supply roll 71 when the cartridge 70 is in place, FIG. 9, thereby applying a light frictional drag which maintains tension on the chart paper 114 being withdrawn from the supply roll.

A somewhat similar leaf spring 129 is mounted on the other guide post 112 and extends forwardly to engage the chart paper adjacent the rear surface 110 of the paper cartridge 70. The outer end of the leaf spring 129 is curved back from the chart paper as shown in FIG. 9 providing a smooth paper-contacting surface of the spring. The inner end of the spring 129 is attached to the metallic thrubolt 130 which extends within the guide post 112 and which is connected to electrical ground potential for the chart recorder 20. The leaf spring 129 thus functions as a paper grounding spring which maintains at ground potential the electrically-conductive coating on the surface of the chart paper. The nature and composition of electrically-coated chart recording papers is well known to those skilled in the art.

The coated paper carried by the cartridge 70 is marked in the conventional manner by passing electrical current through a stylus 134 (FIGS. 7 and 12) which repeatedly traverses the recording paper along a path perpendicular to the direction of paper travel. An electrical current impulse is supplied to the stylus 134 at a particular time as the stylus traverses the recording paper 74, and the electrical signal marks the conductive paper at a location determined by the lateral position of the stylus moving across the paper. Electrical circuitry for applying recording signals to the stylus of a chart recorder are known to those skilled in the art.

The stylus 134 of the present recorder extends transversely from a stylus carrier 135 attached to a flexible belt 136 mounted at one side of the open region 69 which receives the paper cartridge 70. As best seen in FIG. 7, the stylus 134 extends to the left of the belt 136 sufficiently to traverse the chart paper at the right side of the cartridge 70. The stylus travels across the chart paper 73 from top to bottom, as the belt 136 travels downwardly in the direction shown by arrow 137.

Figure 13:
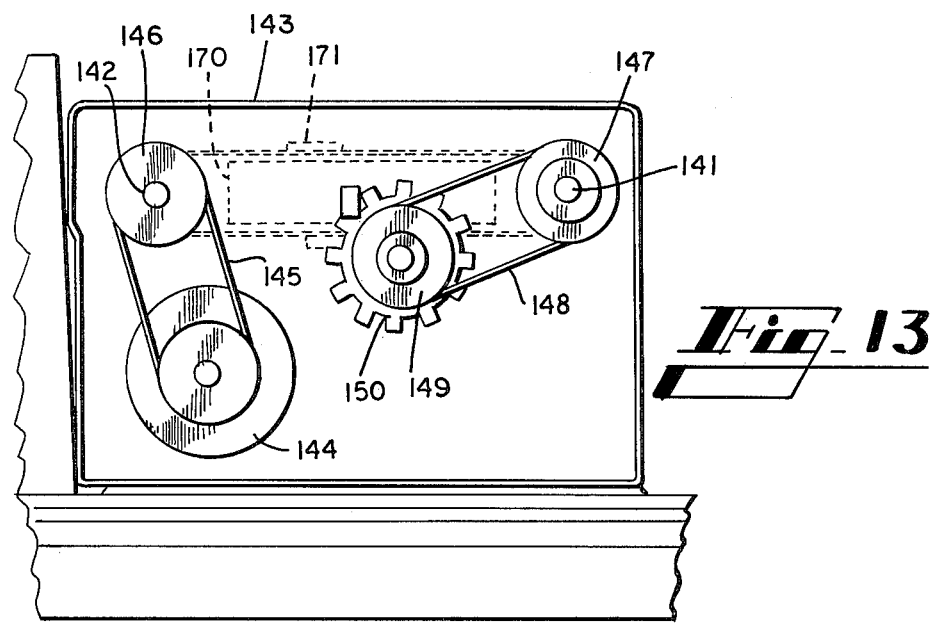
FIG. 13 is a side elevation view from the right side of FIG. 6, showing the drive arrangement for the marking stylus belt.

Turning now to FIG. 12, it is seen that the belt 136 is supported on two wheels 139 and 140 respectively affixed to shafts 141 and 142. These shafts extend into the housing 143 to the right of the belt 136, as viewed in FIGS. 7 and 8. Within the housing 143 is an electrical motor 144 (FIG. 13) coupled by the belt 145 and pulley 146 to drive the shaft 142, thereby rotating the wheel 140 and driving the stylus belt 136. The shaft 141 and attached pulley 147 turn as the belt 136 is driven, driving the light chopper wheel 149 through a belt 148. The light chopper wheel 149 has a serrated peripheral edge 150 consisting of alternately-spaced teeth, and this peripheral edge is interposed between an illumination source 151 and a photocell 152 so as to chop or interrupt the beam of illumination striking the photocell. The photocell 152 thus produces an electrical signal at a frequency determined by the speed of the stylus belt 136, and this speed-responsive signal is utilized by recorder circuitry in a known manner.

Returning to FIGS. 7 and 12, the stylus assembly also includes an electrical brush 156 attached to the stylus carrier 135 and extending outwardly beyond the right side of the stylus belt 136 as viewed in FIG. 7. The brush 156 slides along a metallic contact strip 157 preferably slightly longer than the width of the chart paper 74 traversed by the stylus 134. The contact strip 157 is electrically connected to receive the electrical signals being recorded, and the brush 156 is electrically connected through the stylus carrier 135 to the stylus 134 so as to apply these electrical signals to mark the chart paper.

The metallic contact strip 157 is recessed into an electrically-nonconductive support member 158 so that the ends 159a, 159b of the contact strip are substantially flush with the adjacent surface 160 of the support member 158. The support member 158 is preferably molded from a nonconductive material such as plastic or the like, and the smooth flat surface 160 of the support member extends radially about the stylus belt shafts 141, 142 to include the return surface 161 behind and parallel to the contact strip 157. The surfaces 160, 161 of the strip support 158, together with the contact strip 157, form a smooth substantially uniterrupted surface along a closed path. This substantially uninterrupted surface is repeatedly traversed by the brush 156 as the belt 136 rotates, and the absence of any abrupt discontinuity on the combined contact surface reduces potential damage to the brush due to wear and fatigue otherwise occurring if the brush struck the ends of the contact strip 157 during each belt revolution.

A smooth continuous surface 164 is also provided for traverse by the stylus 134 itself, as the stylus leaves the lower edge of the paper cartridge 70 and returns upwardly behind the belt 136 to re-engage the chart paper at the top of the cartridge. This smooth stylus guiding surface 164 is formed on the guide member 165, located immediately to the left of the stylus belt 136 as viewed in FIG. 7. The stylus support surface 164 extends around the entire stylus travel path except for the discontinuous region 166, which accommodates the right edge of the paper cartridge 70. The stylus 134 thus travels over a smooth and substantially-uninterrupted surface consisting of the guide surface 164 and the chart paper 74 supported by the underlying surface 73 of the paper cartridge. Providing relatively smooth travel surfaces for the stylus and brush promotes the longevity of those elements, and also requires less individual adjustment or tuning of these elements during manufacture of the recorder.

Situated inside the path of the stylus belt 136 is a sensor housing 170, which contains an inductive device such as an induction coil (not shown) operative to induce a detectable electrical current in response to a variable magnetic field. This magnetic field is provided by a permanent magnet carried in a magnet housing 171 attached to the belt 136, preferably at a position on the belt substantially opposite the stylus carrier 135 as illustrated in FIG. 12. More particularly, the magnet in its housing 171 occupies a predetermined position on the belt 136 relative to the stylus 134, and this predetermined position is sensed by the induction coil within the housing 170 each time the magnet passes the induction coil. The electrical signal induced in the induction coil by passage of the magnet thus corresponds to a known position of the stylus 134 for each revolution of the belt, and thereby provides a synchronizing signal for the chart recorder circuitry. The application and use of such synchronizing signals are known in the art.

The range scale 26 previously mentioned with respect to FIG. 2 is shown in greater detail in FIGS. 3, 3A, 3B and 14. The range scale 26 is fabricated from a clear material such as transparent acrylic or the like and includes a range indicating body 174 extending substantially the width of the chart paper in the paper cartridge 70. The body 174 of the range scale is integral with a pair of end members 175 and 176 which extend forwardly of the indicating body, and these end members mount the range scale 26 on the inside 177 of the chart recorder door 23. The body 174 of the range scale 26 thus is spaced a short distance behind the viewing window 24 and the transparent panel 24' covering the viewing window. The end members 175 and 176 of the range scale are secured to the door 23 by suitable fasteners extending through corresponding openings, one of which is shown at 178 in FIG. 14, in the end members.

The body 174 of the range scale 23 has a substantially flat rear surface 181 which is positioned adjacent the chart paper 74 (FIGS. 6 and 7) moving across the face 73 of the paper cartridge 70, when the paper cartridge is in the region 69 and the chart recorder door 23 is closed. One or more sets of range indicating indicia 182 (FIG. 2) are disposed on the body 174 of the range scale 26, so that a person viewing the chart paper 74 through the window 24 of the closed door sees, through the transparent range scale, the marks recorded on the chart paper as well as the range indicating indicia 182 superimposed over the recorded marks. The close juxtaposition of range scale rear surface 181 with the chart paper minimizes viewing parallax between the indicia 181 and marks recorded on the chart paper. It will be understood that the indicia 182 may be calibrated in terms of depth or other information being recorded by the chart recorder, so that the numerical value of this recorded information may be visually ascertained. It will also be apparent that more than one indicia scale 182 may be provided on the range scale, corresponding to different recording ranges provided by the chart recorder.

The range scale 26 is internally illuminated to enhance its readability during nighttime or other low light conditions. Range scale illumination is provided by directing substantially collimated illumination in a substantially normal direction to the upper end 185 of the range scale body 174, an arrangement best seen in FIG. 3, 3A, and 3B. This illumination enters the range scale body through the upper surface 185, substantially parallel to the longitudinal extent of the body 174 and perpendicular to the rear surface 181 of the body and the illumination entering the range scale body through the upper end 185 is internally reflected therein. This internal reflection is assisted by the serrated lower end 186 of the body 174. The serrated end 186 is made of segments beveled at angles promoting substantial internal reflection of illumination striking the lower end within the body 174.

Illumination for the range scale 26 is provided by the bulb 188 mounted in a socket formed in the underside of the upper end member 67. The bulb 188 is spaced slightly above the upper end 185 of the range scale 26, so that the range scale can move with the access door 23 without striking the bulb. Although the length of the range scale upper end 185 may be several times greater than the diameter of the bulb 188, it is possibly to impinge the entire upper end with collimated illumination in a direction normal to the upper end of the range scale. This is accomplished by the segmented parabolic reflector arrangement shown in FIGS. 3A and 3B, together with the bulb 188.

Because light bulbs suited by size and other characteristics for illuminating the range scale do not have a single point-source of illumination, a conventional parabolic reflector cannot effectively collimate the illumination from such bulbs. For example, as seen in FIG. 3B, the filament of bulb 188 consists of three coplanar filament segments ab, bc, and cd. The filament segments ab and cd are mutually parallel and extend laterally across the upper end 185 of the range scale, while the filament segment bc connects the ends of the other two filament segments in a direction parallel to the lengths of the range scale upper end. A conventional parabolic reflector, such as a parabolic cylinder, could at best focus only the rays of illumination from one of the lamp filament segments. Illumination from the other two segments would be defocused and dispersed rather than being collimated.

This problem is overcome with the reflective arrangement shown in FIGS. 3 and 3A. The bulb 188 is positioned beneath a reflector indicated generally at 189, and made up of separate parabolic cylindrical surfaces 190, 191, and 192. These three parabolic surfaces preferably are molded directly into the underside portion of the upper end member 67 making up the reflector 189, and the three separate parabolic surfaces are painted or otherwise treated to have a high reflectance.

The reflector sections 190 and 192, as best seen in FIG. 3A, are respectively located so that the line focus of each reflector coincides with filament segments ab and cd of the lamp 188. Illumination from the filament segments ab and cd is thus collimated toward the upper end 185 of the range scale by the reflectors 190 and 192. The parabolic cylindrical reflector 191 is rotated 90° relative to reflectors 190 and 192, as best shown in FIG. 3, so that the line focus of the reflector 191 is coincident with the filament segment bc of the lamp 188. Illumination from the filament segment bc is thus collimated downwardly toward the range scale upper end 185 by the reflector segment 191. Substantially the entire area of the upper end 185 thus receives collimated illumination emanating from a single bulb 188 which is substantially smaller than the upper end of the range scale, and which may be a conventional bulb.

Figure 16:
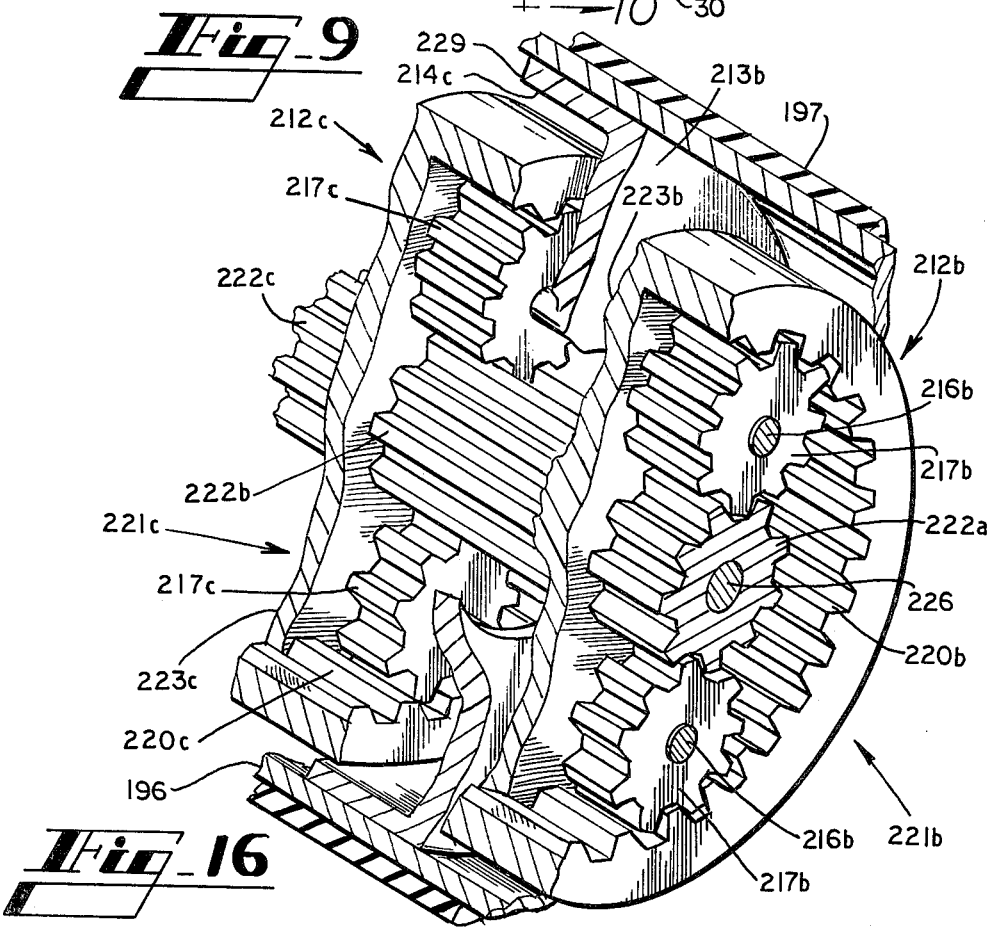
FIG. 16 is an enlarged fragmentary pictorial view illustrating the compound gear drive arrangement in FIG. 15.

Details of the drive roller 117 are shown in FIGS. 15 and 16. The drive roller 117 has a hollow cylindrical housing 196 on which snugly fits a friction sleeve 197 made of an elastomeric material such as neoprene or the like. The friction sleeve 197, as mentioned earlier, is held against the takeup shaft 72 and the chart paper wound thereon, and so the friction sleeve requires a relatively high coefficient of static friction to insure positive drive of the takeup shaft. The ends of the housing 196 are closed by end caps 198 and 199, secured to the housing by retainer wires 200 and 201 disposed in confronting peripheral slots of the end caps and the housing.

An electric motor 202 is disposed within the housing 196 adjacent the end cap 199. The stationary outer housing of the motor 202 is separated from the rotatable housing 196 by the spacer sleeve 203 which surrounds the motor and extends to the right (as viewed in FIG. 15) toward the end cap 199. The spacer sleeve 203 is separated from the end cap 199 by a spring 204, which may be a Belleville washer.

Extending through an axial hole in the end cap 199 is the motor mounting post 125, secured at its inner end 207 to the motor 202. The outer end of the mounting post 125 is secured to the upper flange 119b of the yoke 120, previously described. A pair of electrical leads 126 from the motor 202 extend through the hollow mounting post 125, for connection to a suitable source of power. It will become apparent that the mounting post 125 remains stationary as the drive roller 117 rotates, and the end cap 119 rotates about the stationary mounting post.

The mounting post 124 extends axially through the end cap 198 at the other end of the drive roller 117, and is secured to the lower flange 119a of the yoke 118. The mounting post 124 likewise remains stationary as the drive roller 117, including the lower end cap 198, rotates about the mounting post.

The motor 202 has an output shaft 210 driving a pinion 211, and this pinion engages the first compound drive assembly 212a of a plurality of such assemblies 212a, 212b-, 212k, and 212n. Each of these compound drive assemblies may be identical except for the last such assembly 212n as noted below, and the same reference numerals with appropriate alpha suffixes denote elements common to each compound drive assembly. The compound drive assembly 212a includes a carrier 213a having an outer ring 214a located adjacent the inner wall of the drive roller housing 196. The carrier 213a has a web 215a extending radially inwardly from the right edge of the ring 214a, and four idler gear shafts 216a extend forwardly from the inner extent of the web 215a; only two of these idler gear shafts are visible in FIG. 15. The idler gear shafts 216 of each carrier 213 parallel the axis of the axially-disposed motor shaft 210, and are radially spaced apart therefrom. Two to four idler gears 217a (two being visible in FIG. 15) are rotatably mounted on the corresponding shafts 216a, so that the idler gears of each compound drive assembly are located radially inside the ring 214 of that assembly.

It is now apparent that the motor pinion 211 meshes with the idler gears 217a of the first compound drive assembly 212a spaced radially apart from the motor pinion. The idler gears 217a, in turn, mesh with the inwardly-facing ring gear 220a, located between the idler gears and the ring 214a of the carrier 213a. The ring gear 220a forms part of the compound gear 221a, which also includes the axial pinion 222a extending leftwardly of the ring gear (as viewed in FIG. 15) and joined to the ring gear by the radial web 223a. Referring to FIG. 16, the pinion 222a in turn meshes with the idler gears 217b of the next compound drive assembly 212b, which also includes a compound gear 221b driving idler gears 217c of the subsequent compound drive assembly 212c, and so on.

A compound shaft 226 extends axially through each compound drive assembly 212, and each compound gear 221 is rotatably received about the compound shaft. The left end 227 of the compound shaft 226 fits within the mounting post 124 where the shaft end floats axially and is free to rotate, while the right end 228 of the compound shaft flares outwardly behind the compound gear 221a to axially retain all the compound drive assemblies in position. The compound shaft 226 merely acts as a bearing surface for the compound drive assemblies, which are free to rotate about the compound shaft. A washer 225b,-225k, 225n fitted on the compound shaft 226 between the pinion 222 of each compound gear 221 and the succeeding compound gear provides proper axial spacing between elements, and partially overlaps each idler gear 217 to retain the idler gears in axial position on the respective idler gear shafts. A retaining ring 224 snaps into a groove on the compound shaft 226 just beyond the final washer 225n retaining the idler gears 217n. Thus, a subassembly of the compound drive assemblies (excluding the carrier 212a and its associated idler gears 217a) is held in assembly on the compound shaft 226.

The outer rings 214 of each carrier 213 cannot rotate with respect to each other, because notches 231 are formed on the left end 229 of each outer ring, mating with bosses 230 formed in the confronting right end of the ring forming the next compound drive assembly. The first carrier 213a is similarly engaged by the spacer sleeve 203 surrounding the motor, and it will be recalled that the Belleville spring 204 urges the spacer sleeve leftwardly within the drive roller housing 196. A Belleville spring 233 is fitted in engagement with the left edge of the ring 214n in the final carrier 213n, and is compressed by the end cap 198. The retainer wire 200 is a square cross-section wire having a short right-angle tang 200' formed at one end, and the tang is inserted into the radial hole 235 formed in the end cap 198. The retaining wire is inserted into the facing circular grooves 237a and 237b on the end cap 198 and the housing 196 by inserting the tang 200' into the radial hole 235 through the short slot 236 formed in the wall of the housing over the circular groove 237b. Rotation of the end cap 198 relative to the housing 196 feeds the square retainer wire into the annular space formed by the confronting internal groove 237b and external groove 237a of the housing and end cap, respectively. During this installation procedure compressing forces must be maintained between opposing end caps 198 and 199 to overcome the axial forces of the Belleville springs, and it will be understood that the retainer wire 201 is installed at the other end of the drive roller by a similar procedure. The axial forces of the Belleville springs 204 and 233 provide a tightly compressed assembly of the interlocked carrier outer rings 214 and the spacer sleeve 203. The springs 204 and 233 may be secured to the respective end caps 199 and 198 by epoxy or other suitable means if necessary to transmit sufficient torque to the end caps without slippage.

The idler gears 217n of the final compound drive assembly mesh with the fixed ring gear 232 which is secured to the nonrotating mounting post 124, and which may be integrally formed with the mounting post. It is thus apparent that the ring gear 232, unlike the ring gears 220a—associated with the earlier compound drive assemblies, does not rotate in response to rotation of the idler gears 217n.

The compound drive assembly for the drive roller 117 operates in the following manner. The motor pinion 211 rotates the idler gears 217, which in turn drives the ring gear 220a at a reduced speed determined by the tooth ratio between the motor pinion and the ring gear 220a. The pinion 222a of the compound gear 221a thus rotates at this reduced speed, and in turn drives the idler gears 217b of the next compound drive assembly 212b. A similar speed reduction takes place in the compound drive assembly 212b, and so on for each compound drive assembly within the drive roller 117. A specific embodiment of the chart recorder according to the present invention utilizes seven compound drive assemblies, each providing a reduction ratio of 41/13, providing an overall speed reduction of $(41/13)^7$ or approximately 3104:1. It will thus be seen that a considerable speed reduction (and a corresponding increase in the driving torque of the paper drive roller 117) is available with the present paper drive system. The overall reduction ratio can be changed by omitting one or more of the compound drive assemblies, replacing the omitted assembly with a solid spacing member lacking reduction gears.

Because the idler gears 217n of the final drive assembly engages the fixed ring gear 232, the drive input supplied to the idler gears 217n must rotate the carrier 213n. The spring 233 transfers the torque of carrier 213n to the end cap 198, which in turn is secured to the drive roller housing 196, and so the carrier 213n and the drive roller 117 rotate at the same reduced speed in response to the idler gears 217n. This speed can be varied, of course, by adjusting the speed of the motor output shaft 210, which in turn varies the linear speed of paper being wound on the takeup shaft by frictional engagement of the drive roller 117.

It is thus apparent that the entire paper drive mechanism of the present chart recorder is completely enclosed within the hollow drive roller 117. This drive mechanism is entirely gear-driven, requiring no belts or like members subject to becoming stretched or disengaged in use. Furthermore, the enclosed paper drive assembly is not exposed to dust evolved from the coated chart paper, and is otherwise protected from exposure to dirt and the elements. Furthermore, a supply of lubricant sufficient for the nominal service life of the drive roller can be applied during assembly. The internal design of the roller assembly inherently prevents lubrication migration and contamination, and no servicing should be required.

Although the foregoing embodiment of the present chart recorder is described in the context of a marine depth sounder, it should be apparent that the chart recorder is useful in other environments and for other purposes wherever chart recorders are desired.

It should also be apparent that the foregoing relates to but a disclosed embodiment of the present invention, and that numerous changes and modifications may be made therein without departing from the spirit and scope of the invention as set forth in the following claims.

I claim:

1. Apparatus for recording variable data on a movable recording medium, comprising:
    means supporting a recording medium relative to a marking location;
    marking means movable along a closed path traversing said recording medium at said marking location, and including a member contacting said medium and operative to mark the recording medium at selected locations;
    said closed path traversed by the marking member including a first portion on which the recording medium is supported at said marking location, and including a second portion apart from the recording medium; and
    means disposed along said second portion for contact by said marking member moving along the second portion of said path, so that the marking member is supported along the second portion and thereby traverses the path substantially without interruption.

2. Apparatus for recording variable data on a recording medium, comprising:
    marking means movable along a first path relative to the recording medium;
    said marking means including a marking member operative to mark the recording medium at selected locations, and an input member operatively associated with said marking member;
    means defining a second path along which said input member moves;
    said second path including a first portion contacted and traversed by said input member as said marking member traverses the recording medium, and a second portion including a support member contacted and traversed by said input member as said marking member traverses the remainder of said first path,
    so that said input member traverses said second path substantially without interruption.

3. In a chart recorder having a housing, means within the housing for supporting a recording medium, means operative to make visible marks on the recording medium, and an opening formed in the housing through which the recording medium is accessible, the improvement comprising:
    means defining a closure operatively associated with said housing and selectably operative to close said opening in the housing;
    attachment means operatively associated with said closure and the housing and selectably operative either to open said closure means without separating from the housing, or to separate said closure means from the housing;
    said attachment means comprises means normally operative to define a hinge interconnection of said closure and the housing so that the closure can occupy either an open or a closed position relative to said opening;
    means selectably operative to disconnect said hinge interconnection, so that said closure can be separated from the housing; and
    latch means associated with closure and selectably securing said closure in said closed position.

4. A chart recorder for recording variable data and housing an illuminated indicating scale, comprising:
    means supporting a recording medium for movement;
    means operative to visibly mark the recording medium at selected locations in response to the variable data;
    a range indicating member mounted in fixed relation to the movable recording medium,
    said member being transparent, and having a first surface disposed adjacent the recording medium and a viewing surface facing away from the recording medium;
    indicia on said member providing an indicating scale correlated with the data marked on the recording medium and visible at said viewing surface, so that both the marks made on the recording medium and said indicating scale are visible at said viewing surface;
    means illuminating an edge surface of siad member to direct illumination into the interior of the member; and
    means associated with said member to cause internal reflection of said illumination within the member, so that the indicating scale is illuminated for viewing with the recording medium marks through said member.

5. Apparatus as in claim 4, further comprising:
    a housing containing said recording medium supporting means and said marking means;

an opening defined in said housing, through which the marked recording medium is visible;

closure means associated with said housing and selectably positionable to cover and uncover said opening;

said range indicating member being associated with said closure means to move away from said opening and said recording medium as the closure means is positioned to uncover the opening; and said illuminating means being associated with said housing in position to be optically aligned with said edge surface of said range indicating member when said closure means is positioned to cover the opening.

6. Apparatus as in claim 5, wherein:

said medium support means supports a web of recording medium for movement along a path past said opening; and said range indicating member extending transversely across said movement path.

7. Apparatus as in claim 5, wherein:

said closure means includes a transparent window member through which a portion of the marked recording medium is visible when the closure means covers said opening; and said range indicating member is carried by said closure means between said window member and the recording medium, and in proximity to the recording medium so as to reduce viewing parallax between said indicia and marks on the recording medium.

8. Apparatus as in claim 4, wherein said illuminating means associated with said housing comprises:

an electric lamp having plural filament portions in fixed relation to said edge surface of said range indicating member;

reflector means having a plurality of separate parabolic reflective portions; and each said parabolic reflective portion is operative to collimate illumination from a selected filament portion and to direct said collimated illumination toward said surface of the range indicating member.

9. Apparatus as in claim 8, wherein:

said plural filament portions each comprise an elongated filament member axially nonaligned with other filament members; and each said parabolic reflective portion comprises a parabolic cylindrical segment having a focal line substantially coinciding with a selected elongated filament, so as to collimate illumination from the elongated filament and direct the collimated illumination toward a portion of the surface of said range indicating member.

10. Apparatus as in claim 9, wherein:

said plural nonaligned filament members all occupy a plane parallel to the plane of said edge surface of the range indicating member; and the focal line of each said parabolic cylindrical segment is substantially parallel to a corresponding filament member.

11. Roll with internal reduction drive, comprising:

roll means having an exterior surface and an open internal region;

motive means within said internal region;

said motive means having a stator fixed relative to said exterior surface, and output means rotatable relative to said stator;

idler means disposed within said internal region and including idler gear means operatively driven by said output means;

a compound gear means rotatably disposed within said internal region, said compound gear means having an input gear operatively driven by said idler means, and having an output member operatively associated with said input gear; and means disposed within said internal region and operatively interconnecting said output member to said roll means so that the roll means is rotatably driven in response to rotation of said compound gear means.

12. Apparatus as in claim 11, wherein:

said compound gear means is a first such means; and said interconnecting means comprises at least one other compound gear means having an input gear driven in response to the output member of said first compound gear means and having an output member operatively connected to drive said roll means.

13. Apparatus as in claim 11, wherein:

said output means of said motive means and said compound gear means are both coaxially disposed with the axis of rotation of said roll means.

14. Apparatus as in claim 11, wherein:

said roll means includes first and second end means rotatable with said exterior surface;

first support means affixed to said stator and nonrotatably extending through one said end means to provide a first mounting support for said roll; and second support means nonrotatably extending through the other said end means to provide a second mounting support for said roll.

15. Drive roll apparatus, comprising roll means mounted for rotation about an axis, said roll means having a cylindrical periphery surrounding a hollow internal region;

motive means disposed in said internal space and having a rotatable member;

idler means disposed in said internal space in radial relation to said rotatable member and operatively driven thereby;

compound drive means in said hollow region, and having an input member operatively associated with said idler means, and an output member coaxial with said axis and axially spaced apart from said idler means; and means in said hollow region interconnecting the output member of said compound drive means to apply rotational torque to the roll means.

16. Apparatus as in claim 15, wherein said idler means comprises:

at least one idler member driven by the rotatable member of said motive means; and a carrier rotatably supporting said idler member in driving relation to the input member of said compound drive means, so that said idler member is rotated by said motive means, and is supported by said carrier member to rotate said compound drive means.

17. Apparatus for recording variable data on a movable recording medium, comprising:

means operative to mark the recording medium at a selected location in response to the variable data;

means supporting a supply of recording medium in operative relation to said marking means, said supporting means comprising a medium supporting cartridge and cartridge receiving means operative to removably receive and support said cartridge in fixed relation to said marking means;

said medium supporting cartridge including means receiving a supply of said recording medium for selectable movement relative to said marking means;

said cartridge receiving means including drive means operative to impart said relative movement of said recording medium when said cartridge is in said cartridge receiving means;

said cartridge comprising means to receive a supply of recording medium to be marked, and means for rotatably supporting a takeup member for winding the recording medium moved past said marking means;

said drive means comprises a powered drive roll positioned in said cartridge receiving means to frictionally contact the recording medium receiving periphery of said takeup member when said cartridge is disposed in said cartridge receiving means, so as to rotate said takeup member at a selected speed and thereby to wind the recording medium onto said takeup member from said supply member; and means yieldably urging said drive roll into said engagement with said takeup member and allowing said drive roll to be moved away from said takeup member as an increasing amount of the recording medium becomes wound around the takeup member, so that said drive member can maintain frictional driving relation with said takup member as the recording medium is wound onto the periphery of the takeup member.

18. Apparatus as in claim 17 wherein:
said powered drive roll comprises
motive means connected to operate said drive member at a selected constant speed, thereby winding the recording medium past said marking means onto the takeup member at said selected constant speed.

19. Apparatus as in claim 17, wherein the recording medium is a medium operative to show visible marks; and
said marking means is selectably operative to impart visible marks to the medium.

20. Apparatus as in claim 17, further comprising:
means associated with said cartridge receiving means to contact the periphery of said supply roll of recording medium and impart drag sufficient to keep the supply roll from unwinding without operation of said drive means, when said cartridge is in said cartridge receiving means.

21. Apparatus for recording variable data on a movable recording medium,, comprising:
means operative to mark the recording medium at a selected location in response to the variable data;
means supporting a supply of recording medium in operative relation to said marking means, said supporting means comprising a medium supporting cartridge and cartridge receiving means operative to removably receive and support said cartridge in fixed relation to said marking means;
said medium supporting cartridge including means receiving a supply of said recording medium for selectable movement relative to said marking means;
said cartridge receiving means including drive means operative to impart said relative movement to said recording medium when said cartridge is in said cartridge receiving means;
said marking means including stylus means movable along a closed path and operable to mark the recording medium at selected locations;
one part of said closed path tranversing said cartridge and the recording medium thereon, and another part of said closed path tranversing said cartridge receiving means; and
said cartridge includes means forming said one part of said closed path when the cartridge is in the cartridge receiving means.

22. Apparatus as in claim 21, wherein:
said means forming part of said closed path is a first such part associated with said cartridge; and further comprising
means associated with said cartridge receiving means comprising said other part of said closed path traversed by said stylus means; and
said first and second parts of said path are contiguous to each other so as to form complementary portions of said closed path when said cartridge is in place in the cartridge receiving means,
so that said stylus means can traverse the closed path substantially without interruption when said cartridge is in place.

23. Apparatus as in claim 21 wherein:
said stylus means comprises a first stylus member moving along said closed path to mark the recording medium, and a second stylus member electrically connected to the first stylus member;
means defining a second path along which said second stylus member moves;
said second path including a first electrically conductive portion associated with said cartridge receiving means and traversed by said second stylus member as said first stylus member traverses said one part of said closed path, and a second portion supporting said second stylus member as said first stylus member traverses said other part of said closed path; and
said first and second portions forming complementary portions of said second path, whereby said second stylus member can traverse said second path substantially without interruption.

24. Apparatus for recording variable data on a movable recording medium, comprising:
means operative to mark the recording medium at a selected location in response to the variable data;
means supporting a supply of recording medium in operative relation to said marking means, said supporting means comprising a medium supporting cartridge and cartridge receiving means operative to removably receive and support said cartridge in fixed relation to said marking means;
said medium supporting cartridge including means receiving a supply of said recording medium for selectable movement relative to said marking means;
said cartridge receiving means including drive means operative to impart said relative movement to said recording medium when said cartridge is in said cartridge receiving means;

said cartridge receiving means comprising a pair of mutually confronting members spaced apart from each other to define an open region within which said cartridge is received;

said cartridge including means receiving a supply roll of recording medium, means receiving a takeup member for winding the recording medium from the supply roll, and a medium supporting surface along which the recording medium passes for viewing at said open region after moving past said marking means;

complementary means on each member, and on said cartridge on either side of said medium supporting surface, operative to locate said cartridge in said region in predetermined relation to said marking means and said drive means; and latch means releasably retaining said cartridge in said region.

25. Apparatus as in claim 24, wherein:

said complementary means on the cartridges includes a pair of flanges extending backwardly from said medium supporting surface in engagement with said members to locate the cartridge in said region; and resilient means engaged when the cartridge is retained in the region, said resilient means urging the cartridge out of the region so that the cartridge is at least partially displaced from the region upon releasing said latch means.

26. Apparatus for recording variable data on a recording medium, comprising:

marking means movable along a first path relative to the recording medium;

said marking means including a marking member operative to mark the recording medium at selected locations, and an input member operatively associated with said marking member;

means defining a second path along which said input member moves;

a flexible endless belt mounted on a pair of spaced apart pulleys to traverse a closed path including said first path;

said marking means and said input member being carried by said belt for movement therewith;

signaling means mounted on the outside of said belt in predetermined fixed relation to said marking means; and sensing means located between said spaced apart pulleys so as to be within said closed path, and operative in response to said signaling means to provide an output signal whenever said signaling means traverses a certain location on said closed path.

27. Apparatus for recording variable data on a recording medium, comprising:

marking means movable along a first path relative to the recording medium;

said marking means including a marking member operative to mark the recording medium at selected locations, and an input member operatively associated with said marking member;

means defining a second path along which said input member moves;

said second path including a first portion contacted and traversed by said input member as said marking member traverses the recording medium, and a second portion contacted and traversed by said input member as said marking member traverses the remainder of said first path, so that said input member traverses said second path substantially without interruption;

a flexible endless belt mounted on a pair of spaced apart pulleys to traverse a closed path including said first path;

said marking means being carried by said belt for movement therewith;

location means carried by said belt in predetermined fixed relation to said marking means;

sensing means located between said spaced apart pulleys and operative in response to said location to provide an output signal whenever said location means traverses a certain location on said closed path;

said location means comprising a magnet mounted on the outside of said belt to avoid interfering with said pulleys; and said sensing means being located within said closed path and operative to sense the movement of said magnet past a certain fixed location on said closed path, corresponding to a predetermined position of said marking means in relation to the recording medium.

28. Drive roll apparatus, comprising:

roll means mounted for rotation about an axis, said roll means having a cylindrical periphery surrounding a hollow internal region;

motive means disposed in said internal space and having a rotatable member;

idler means disposed in said internal space in radial relation to said rotatable member and operatively driven thereby;

said idler means comprising at least one idler member driven by the rotatable member of said motive means, and a carrier rotatably supporting said idler member in driving relation to the input member of said compound drive means, so that said idler member is rotated by said motive means and is supported by said carrier member to rotate said compound drive means;

compound drive means in said hollow region, and having an input member operatively associated with said idler means, and an output member coaxial with said axis and axially spaced apart from said idler means;

said output member interconnecting means comprising at least one other idler member in radial relation to said axis and axially spaced apart from said first idler member and operatively associated with the output member of said compound drive means, another carrier rotatably supporting said other idler member and coupled to said roll means, and nonrotatable means engaging said other idler member, so that input rotation applied to said other idler member rotates said other carrier about said axis, and thereby rotate said roll means; and means in said hollow region interconnecting the output member of said compound drive means to apply rotational torque to the roll means.

* * * * *